(12) United States Patent
Cardoso et al.

(10) Patent No.: US 7,819,676 B1
(45) Date of Patent: Oct. 26, 2010

(54) ELECTRICAL POWER DISTRIBUTION SYSTEM

(75) Inventors: Roberto Cardoso, Huntington Beach, CA (US); Timothy Cortes, Mechanicsville, VA (US); Enrique Horta, Santa Ana, CA (US); Miguel Jauregui, Paramount, CA (US); John Kammeter, Richmond, CA (US); Alan Katz, Huntington Beach, CA (US); Keith Schmid, St. Charles, IL (US)

(73) Assignee: Power Distribution Inc., Richmond, VA (US)

( * ) Notice: Subject to any disclaimer, the term of this patent is extended or adjusted under 35 U.S.C. 154(b) by 0 days.

(21) Appl. No.: 12/617,289

(22) Filed: Nov. 12, 2009

(51) Int. Cl.
*H01R 25/00* (2006.01)
(52) U.S. Cl. ...................... 439/115; 439/259
(58) Field of Classification Search ......... 439/110–116, 439/259, 265
See application file for complete search history.

(56) References Cited

U.S. PATENT DOCUMENTS 3,495,132 A * 2/1970 Anhalt et al. ............... 439/259
4,407,555 A * 10/1983 Lockard ..................... 439/259
6,896,534 B2 * 5/2005 Ruckerbauer ............... 439/259
7,572,137 B2 * 8/2009 Fekonja ..................... 439/259

* cited by examiner

*Primary Examiner*—Tho D Ta
(74) *Attorney, Agent, or Firm*—Bacon & Thomas, PLLC

(57) ABSTRACT

An electrical power distribution system that can provide power to load equipment at any point along its length includes two main components: a power track housing assembly with current carrying conductors that can be mounted to the wall, ceiling or under the floor, and a plug-in power tap. The power track housing assembly includes a housing, insulators, and two or multiple conductors. In order to increase the housing assembly length, the housing assembly is preferably arranged such that multiple housing assemblies can be spliced together using cam operated splicing assemblies that form straight, "90 degree" and/or "T" splices to configure the system to match the equipment arrangement, and that allow all conductors in respective housing assemblies to be connected to each other simultaneously. The plug-in power taps also employ a system such as a shaft-cam mechanism that allows the assemblies to be electrically connected to all phase conductors within the power track housing assembly simultaneously. In addition, the power taps may include circuit breakers or other protective devices, and/or other sub-modules.

58 Claims, 9 Drawing Sheets

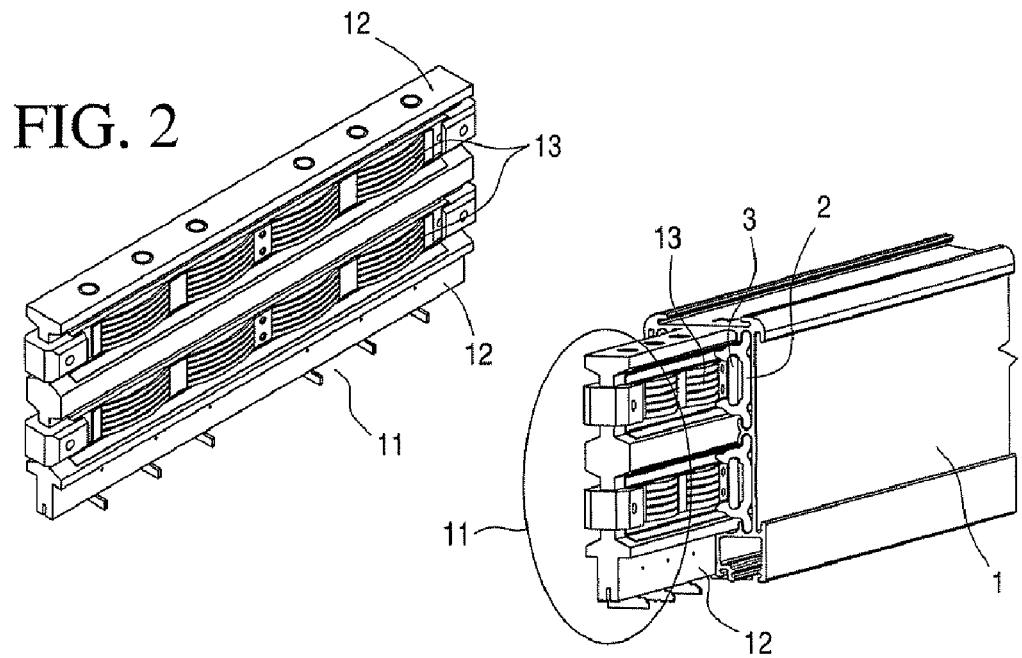
FIG. 2
FIG. 2A
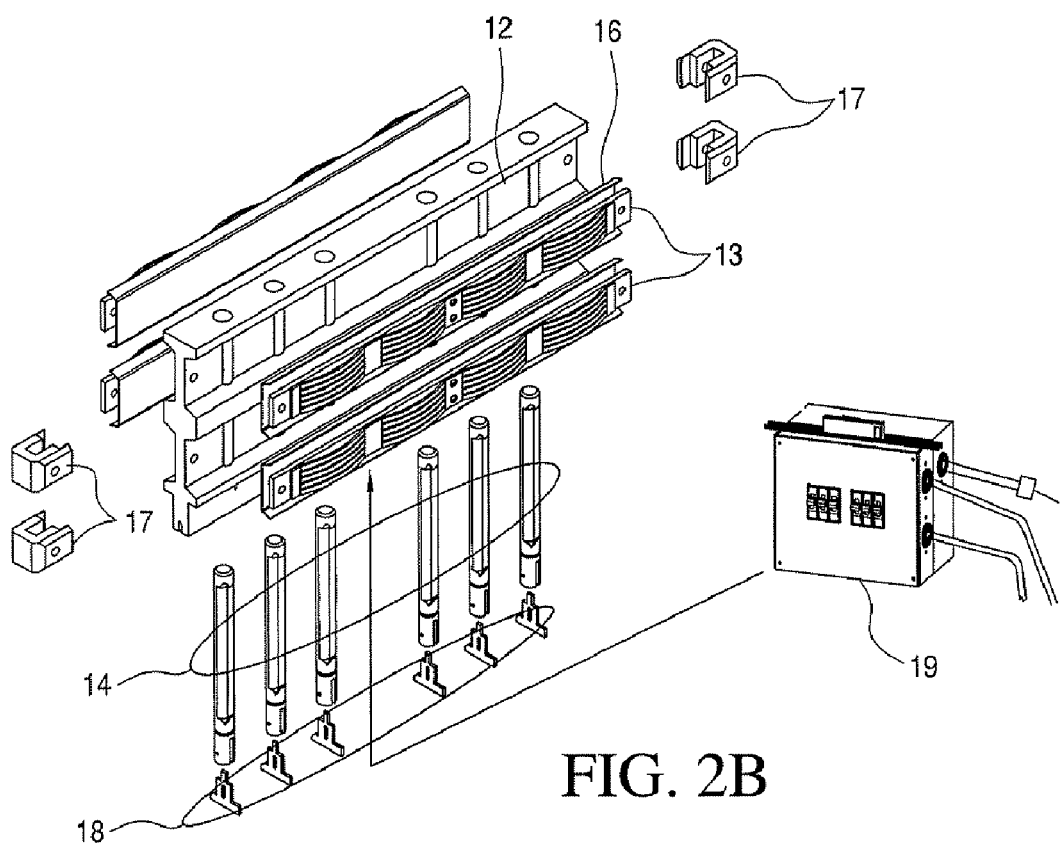
FIG. 2B

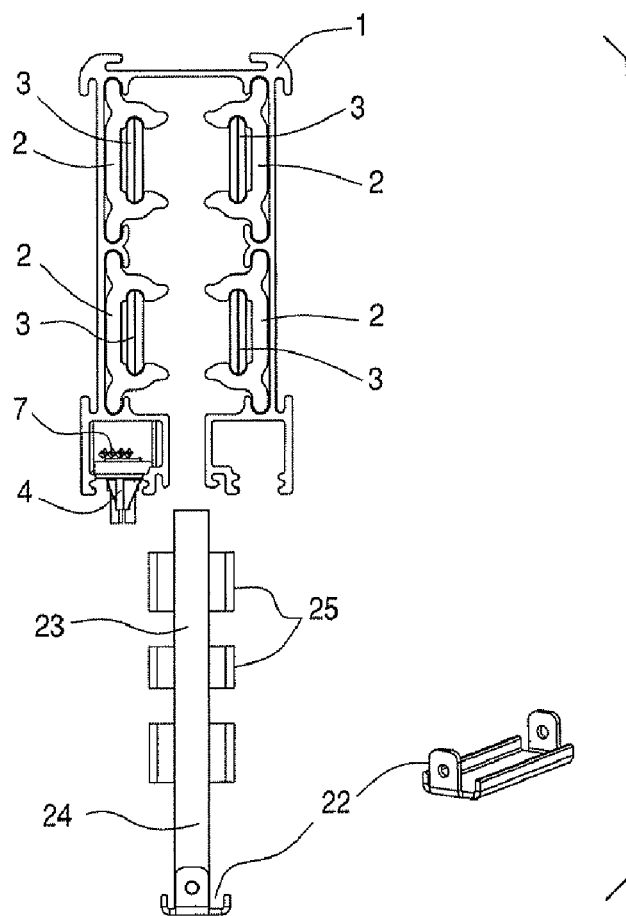
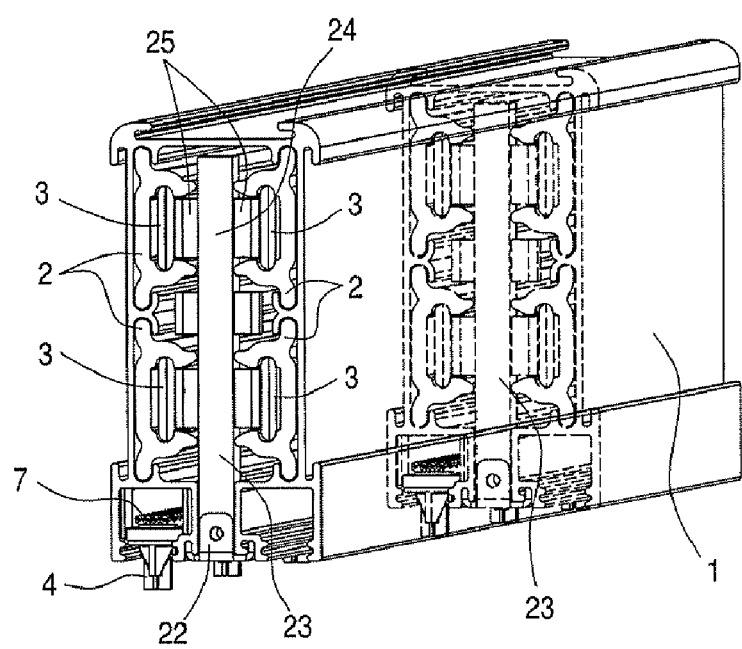
FIG. 3
FIG. 3A

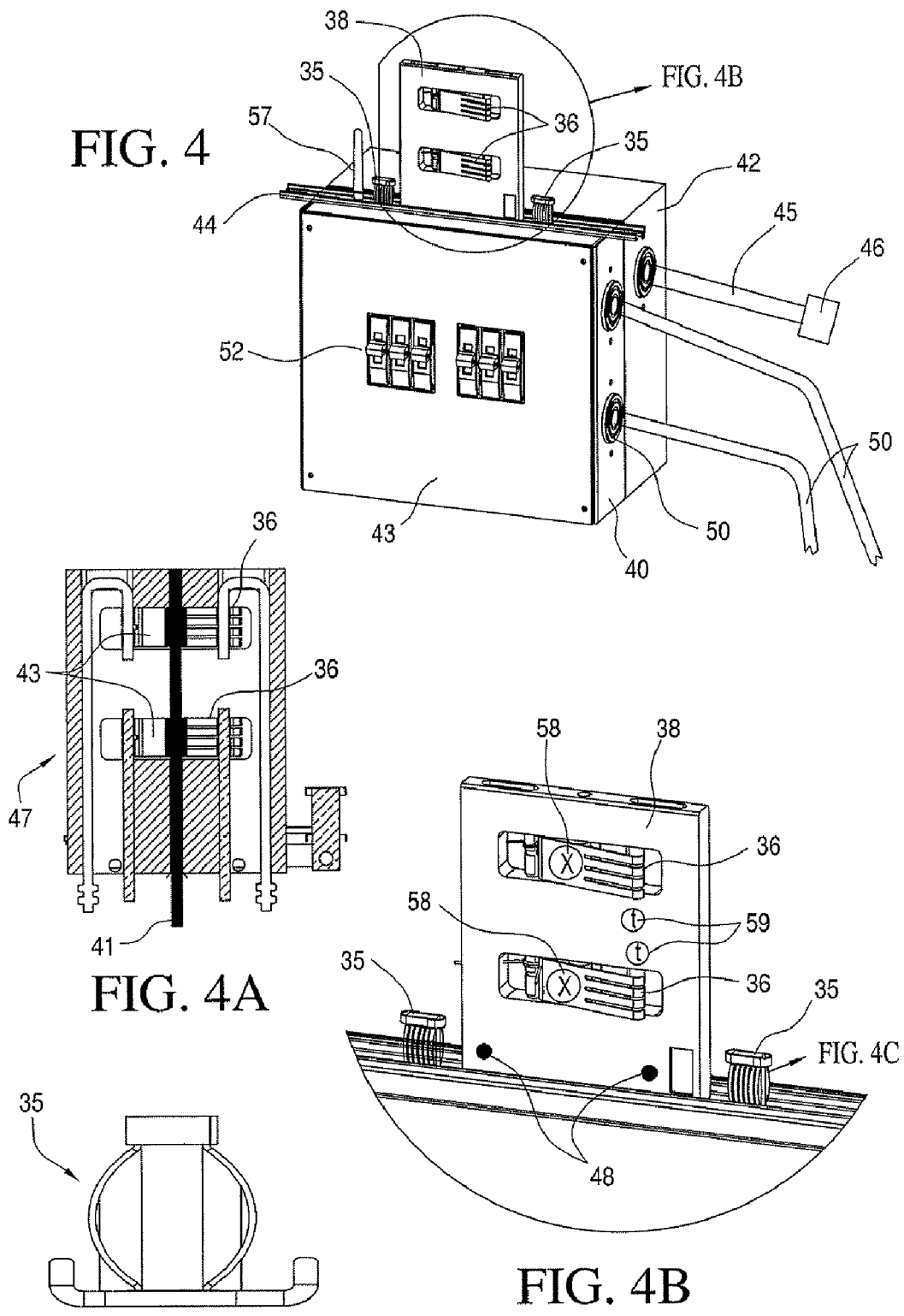

ELECTRICAL POWER DISTRIBUTION SYSTEM

BACKGROUND OF THE INVENTION

1. Field of the Invention

This invention relates to a system for distributing electrical power from a junction box to electrical devices via a busway or track, to which distribution sub-assemblies or power taps may be removably connected without shutting down the power supply. The busway or track includes multiple conductors to provide DC power, or single or multiple phase AC power, with multiple track sections or housing assemblies being joined together by unique cam operated splicing assemblies, and the power taps also being connected to the track sections or housing assemblies by a contact extending mechanism or device, such as a cam, that does not require the power tap mechanical structure to be rotated once installed in the power track housing assembly in order to make electrical connection to the track conductors.

2. Description of Related Art

The rigorous demands of mission critical data center sites require methods to quickly disconnect and reconnect equipment without removing power from any other equipment. Additionally, all power distribution systems of the type used in mission critical data centers and other sites requiring continuous power distribution to multiple devices must be capable of providing monitoring of power parameters both locally and remotely.

The "Continuous Bus Power Distribution System" (CBusPDS) of the present invention provides an alternative to the floor mounted power distribution units (PDUs) with attached under floor or overhead cables that are conventionally used to distribute electrical power in mission critical data centers and similar sites. Instead, the CBusPDS of the present invention may be mounted overhead or on a wall, as well as under a raised floor if desired, so as to provide continuous power to equipment or equipment cabinets. The overhead or wall mounted CBusPDS configuration allows users/installers to quickly insert or relocate plug-in power taps for power drops for added or replacement equipment, and to quickly remove the power taps for repair or replacement as necessary.

Electrical distribution systems in the form of busways or tracks are well-known. For example, tracks are often used to distribute power to lighting devices in so-called "track lighting systems." Other examples include the power distribution systems disclosed in U.S. Pat. Nos. 5,336,097; 5,449,056; 6,039,584; 6,105,741; 6,296,498; 6,521,837; 6,517,363; 6,805,226; 7,374,444; 7,468,488; and 7,470,861; and U.S. Patent Publication No. 2008/0302553, which represent just a few of the patents and patent publications directed to electrical distribution systems involving tracks or busways. However, most of the prior track or busway systems are unsuitable for mission critical applications because of the lack of adequate protection and monitoring features, and as a result the operators of mission critical data centers and similar sites continue to rely primarily on underfloor cabling and distribution sub-assemblies capable of providing the necessary monitoring.

SUMMARY OF THE INVENTION

It is accordingly an objective of the invention to provide an electrical distribution system for sites and equipment requiring continuous electrical power, and which may be adapted to provide protective and/or monitoring features suitable for mission critical applications (although the electrical distribution system of the invention may also be used in non-mission critical applications, with or without all of the protective and/or monitoring features described herein).

It is a further objective of the invention to provide an electrical distribution system that may be mounted overhead or on a wall, as well as under a floor, for convenient access to plug-in power taps.

According to a preferred embodiment of the invention, the electrical power distribution system is in the form of a "Continuous Bus Power Distribution System" or CBusPDS that can provide power to load equipment at any point along its length, and includes two main components: a power track housing assembly with current carrying conductors that can be mounted to the wall, ceiling or under the floor, and a plug-in power tap that can be mounted to the power track housing assembly anywhere along its length.

The power track housing assembly of the preferred embodiment includes a housing, insulators, and two or multiple conductors, which can have different current carrying capacity. In order to increase the housing assembly length, the housing assembly is preferably arranged such that multiple housing assemblies can be spliced together using splicing assemblies that include cam, wedge, or similar devices for causing contacts in the splicing assembly to engage bus bars in the housing assemblies, that form straight, "90 degree," "T," "X," or other splices to configure the CBusPDS to match the equipment arrangement, and that allow all conductors in respective housing assemblies to be connected to each other simultaneously.

Power to the power track housing assembly of the preferred embodiment is supplied by a power termination assembly that can be spliced to the power track housing assembly in order to connect the distribution system to a power source, and that may contain circuit breakers or other protective devices, and/or other sub-modules such as, but not limited to, power and temperature monitoring circuits, DC power supplies, transformers, voltage inverters/converters or frequency inverters/converters. The CBusPDS can either be end-fed with power from the power termination assembly, or center fed with power from the power termination assembly via a "T" splice.

Like the above-mentioned housing assembly splices, the plug-in power taps of the preferred embodiment employ a shaft-cam system (or similar contact extending mechanism or device) that allows the assemblies to be electrically connected to all phase conductors within the CBusPDS power track housing assembly simultaneously. In addition, the power taps may include circuit breakers or other protective devices, and/or other sub-modules such as, but not limited to, power and temperature monitoring circuits, DC power supplies, transformers, transfer switches, voltage inverters/converters or frequency inverters/converters.

Because of the contact-extending shaft-cam system used to connect power taps to the power track housing assembly of the preferred embodiment, the preferred power track housing assembly has the advantage that it does not require the plug-in power tap mechanical structure to be rotated once installed in the housing assembly in order to make electrical connection as do other products, thereby reducing the chance of improper installation or excessive wear during repeated connection and removal.

In addition to the power supply conductors, the power track housing assembly of the preferred embodiment may optionally be designed to allow a "bare" fiber optic strand to be incorporated within the housing assembly to pick up IR or other light frequency signals from the electronics in the plug-in power taps anywhere along the housing assembly to allow network communications through the track housing power termination assembly and/or one or more other wired or wireless network-connected communications units connected to or included in one or more of the housing assemblies.

Finally, in addition to the plug-in power taps of the preferred embodiment, those skilled in the art will appreciate that other types of plug-in drop down/take off devices may be installed into the track housing assembly, and that the housing assembly and plug-in power taps of the illustrated assembly need not necessarily be used together. For example, in order to improve the mechanical stability and structure of the CBus-PDS, plug-in drop down/take off devices be included to enable the CBusPDS to withstand the mechanical forces associated with extreme over current and short circuit conditions. On the other hand, a shaft-cam system may be used to secure the plug-in power taps but not the splices or power termination sub-assembly. These and other variations of the illustrated embodiment are intended to be included within the scope of the invention.

BRIEF DESCRIPTION OF THE DRAWINGS

FIG. 2 is an isometric view of a power track splice assembly constructed in accordance with the principles of the preferred embodiment.

FIG. 2a is an isometric view of a power track splice assembly that has been inserted into the power track housing assembly of FIG. 1.

FIG. 2b is an exploded isometric view illustrating the construction of the power track housing assembly of FIGS. 2 and 2a. perspective is a schematic block diagram showing basic elements of a power supply to which the principles of a preferred embodiment of the invention may be applied.

FIG. 3 is an end view showing the power track housing assembly of FIG. 1 and an internal mechanical support therefor.

FIG. 3a is an isometric view showing coupling of the power track housing assembly and internal mechanical support illustrated in FIG. 3.

FIG. 4 is an isometric view of a plug-in power tap constructed in accordance with the principles of the preferred embodiment of the invention.

FIG. 4a is a cross-sectional end view of the plug-in power tap of FIG. 4.

FIG. 4b is an enlarged isometric view of the coupling portion of the plug-in power tap of FIG. 4.

FIG. 4c is a side view of grounding springs used in the plug-in power tap of FIG. 4.

DETAILED DESCRIPTION OF THE PREFERRED EMBODIMENTS

Figure 1:
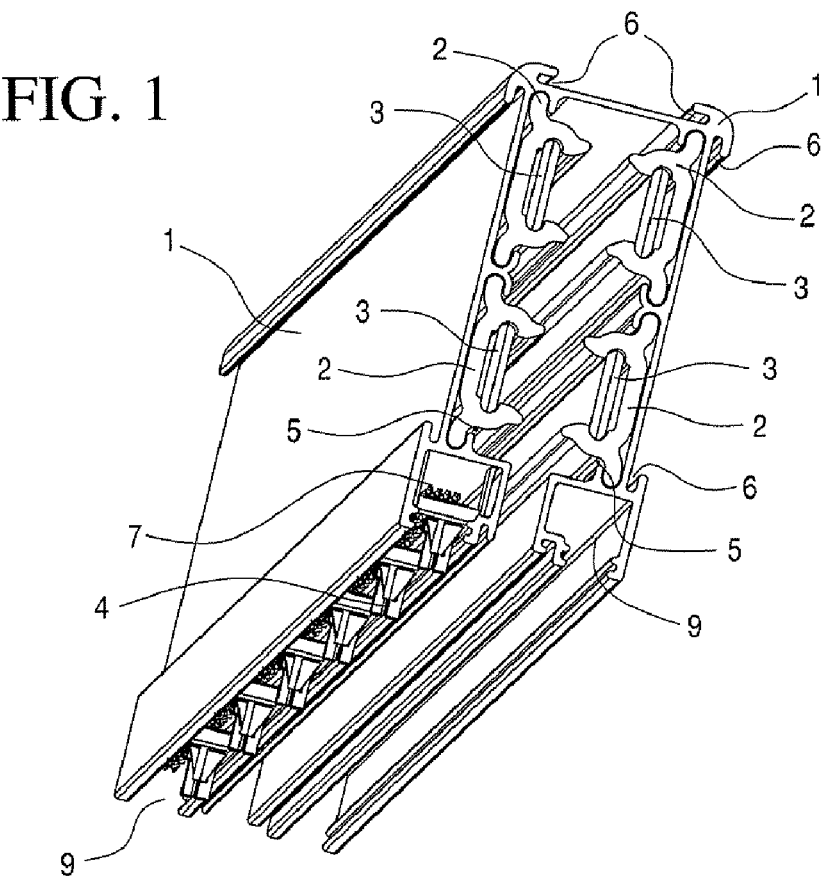
FIG. 1 is an isometric view showing a power track housing assembly constructed in accordance with the principles of a preferred embodiment of the invention.
Figure 1A:
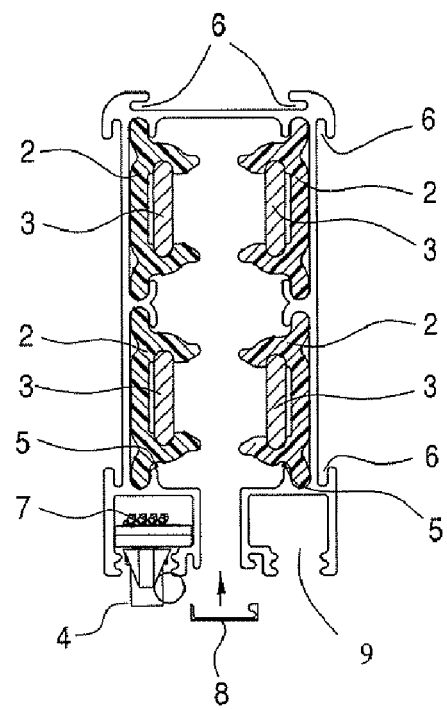
FIG. 1a is a cross-sectional end view of the power track housing assembly of FIG. 1.

FIGS. 1 and 1a illustrate a power track housing assembly with isolated high current conductors or bus bars 3 according to a preferred embodiment of the invention. The power track housing assembly of FIG. 1 is made up of four major components: a housing or enclosure 1; insulators 2; the high current conductors or bus bars 3; and communications components including signal connectors 4 and cable 7. Housing or enclosure 1 may include grooved runways 6 extending along the top and sides of the housing assembly for mounting or securing EMI shielding in the form of flat plates (not shown) made of a magnetically conductive material such as Mu metal, and/or mounting plates (not shown) made of the a magnetically conductive material for mounting the runway to a wall or ceiling.

In addition, the housing 1 of the power track housing assembly may be provided with sub-cavities 9, and/or compartments, passages, grooves, recesses, or the like to accommodate the insulators and/or signal carrying components. The signal components may be positioned in a separate compartment extending along the length of the housing and covered by optional slot covers 8 for safety or EMI shielding, with the signal connectors 4 being connected to each other by a cable 7 that extends along the signal component compartment. Connectors 4 and cable 7 may be arranged to carry electrical signals or for fiber optic communications.

In addition to or instead of EMI shielding plates, housing 1 may itself be fabricated or extruded of any materials that are a reasonable conductor of current or magnetic flux. A current conductor will be a shield for electric field interference, while if the housing material is magnetically conductive, it will be a shield for magnetic fields.

The housing 1 shown in FIG. 1 has a complex cross section of extruded material. However, those skilled in the art will appreciate that the cross section can be a simple rectangular cross section with the conductors mounted with brackets or in any other configuration, so long as a continuous opening is provided at the bottom of the housing assembly to permit insertion of a plug-in power tap as described below in connection with FIGS. 4 and 4a-4i.

Although four high current conductors or bus bars 3 are illustrated in FIGS. 1 and 1a, those skilled in the art will appreciate that the invention is not to be limited to a four bus bar arrangement, or to the particular shape, dimensions, and configuration of the illustrated conductors. In addition, the conductors may be arranged for single phase power, two pole power, two pole power with neutral, or three phase power with or without neutral plus ground or DC power. Still further, the design of the insulators 2 may be varied to accommodate different conductors, so long as the thickness of the insulators provides a sufficient distance between the conductors 3 and the housing 1 to prevent arcing in the example of a grounded conductive housing.

In the illustrated embodiment, use of individual insulators rather than a continuous insulator is preferred because it prevents arcing from one conductor to another, although a continuous insulator may be substituted without departing from the scope of the invention. If arcing does occur, it would be between the conductor and the grounded housing and generally the conductor to housing voltage is less than the conductor to conductor voltage.

FIGS. 2, 2a, and 2c show a splice assembly 11 used to connect power track housing assemblies according to the preferred embodiment of the invention. The illustrated splice assembly is adapted to connect housing assemblies having four high current conductors or bus bars, as illustrated in FIGS. 1 and 1a, but may likewise be adapted to connect housing assemblies with different numbers and arrangements of conductors or bus bars, as discussed above.

As shown in FIG. 2a, one end of the housing 12 of splice assembly 11 is arranged to be inserted into an end of a first power track assembly housing 1 and the opposite end of the splice assembly is arranged to be inserted into an end of a second power track housing assembly (not shown) in order to extend the CBusPDS to a desired length by joining the housing assemblies together. Each splice assembly includes a plurality of resilient current carrying fingers 13 equal in number to the number of conductors 3 in the power track housing assemblies to be connected. When the splice assembly is inserted into the housing 1 of the power track housing assembly, as illustrated in FIG. 2a, then the current carrying fingers 13, shown in FIGS. 2 and 2b, are extended by a contact-extending mechanism or device, such as the cams 14 described in more detail below, to engage the conductors 3 in order to conduct power between the respective conductors 3 of the housing assemblies being joined together. Although the contact-extending mechanism or device is illustrated as utilizing cams, it will be appreciated that other devices for moving the conductors, such as wedge type insertion devices, may be substituted for the illustrated cams.

The current carrying fingers 13 are positioned in recesses on both sides of the splice housing 12, with splice housing 12 being made of an electrical insulating material to electrically isolate the respective current carrying fingers 13, and shaped to fit within the housing 1 of a respective power track assembly. The shape of the housing 12 will depend on the shape of the power track housing assembly into which the splice assembly 11 is to be inserted, as well as on the shape and configuration of the current carrying fingers 13, which in turn will depend on the configuration of the conductors 3 of the power track housing assembly. As shown in FIG. 2c, additional insulating material 16 may be added to increase a distance between the current carrying fingers to provide added arc protection. In addition, as shown in FIG. 2c, the current carrying fingers 13 may be in the form of conductive strips that are clipped to the added insulators 16 and/or splice housing 12 by hold-down brackets 17.

In order to ensure a good electrical connection between current carrying fingers 13 of the splice assembly and conductors 3 of the power track housing assembly, cams 14 of the preferred embodiment are shaped to cause fingers 13 to extend in a direction perpendicular to the direction of insertion and away from the splice assembly housing 12 in order to securely engage the conductors 3 of the track housing assembly after the splice assembly has been inserted into the track housing assembly. By causing the fingers 13 to engage conductors 3 after insertion, unnecessary wear on the fingers and conductors is prevented, and insertion of the splice assembly into the power track housing assembly is facilitated. The subsequent engagement of the fingers 13 and conductors 3 may, in addition to ensuring a good electrical connection, help retain the splice assembly within a respective housing assembly, although such retention may not be necessary since the respective housing assemblies being joined will be mounted on a common surface with the splice assembly captured therebetween.

As illustrated in FIG. 2b, the cams 14 may further include inserts 18 to facilitate rotating of the cams following insertion of a splice assembly into a power track housing assembly, although those skilled in the art will appreciate that other means for rotating the cams, such as integral knobs, slots for a screwdriver, and so forth may be used. The exact cross-sectional shape and dimensions of the cams 14 will depend on the amount of pressure to be exerted on the current carrying fingers 13, and will be easily determined by the skilled artisan.

In addition, the splice assembly may include a sub-assembly 17 containing components and/or electronics for current monitoring or protection, and connectors, not shown, may be used to connect fiber strands and or wire cables between power track housing assembly sections. Electrical connections may also be provided at each end of the finger assembly to allow voltage drop measurement, and temperature sensors attached directly to the current carrying fingers 3, the voltage drop measurement connections and temperature sensors being connected to integrated voltage and/or temperature monitoring circuits contained in the electronics section and arranged to communicate with a network, remote display, or integrated display. Alternatively, IR or other types of remote temperature sensor can be imbedded to monitor finger temperature and communicate directly with a network or with electronics in the sub-assembly 19.

FIGS. 3 and 3a show an internal mechanical support device 23 for insertion into the power track housing assembly at desired locations to supply added mechanical support according to the preferred embodiment of the invention. The support devices 23 are installed to prevent the conductors from deforming due to the forces that can be produced by the high currents in the event of a short circuit, and arranged to be installed in the field or at the manufacturing location. As illustrated, the mechanical support device 23 includes an upright support 24 and transversely extending arms 25 that engage the conductors 3 to prevent them from deforming inwardly. The support device may be slid into the housing assembly by inserting it into an open end of the section before termination or splicing to other housing assemblies, and secured by a bottom plate 22, although it is within the scope of the invention to vary the shape and configuration of the support in numerous ways without departing from the scope of the invention, including provide a design that rotates or cams into engagement with the conductors 3 upon insertion into the housing assembly. Since the support device is designed to engage the conductors 3 in order to prevent deformation, the support device should be made of a material that is not electrically conductive.

FIGS. 4 and 4a-4i show a plug-in power tap with optional power conversion and/or monitoring circuits in a sub-assembly according to the preferred embodiment of the invention. Like the splice arrangement illustrated in FIGS. 2, 2a, and 2c, the power connections use spring fingers 36 that are extended by a contact-extending mechanism or device such as shaft-cam assembly 47 described below, to make contact with the conductors 3 in the power track housing assembly, thereby facilitating insertion of the plug-in power tap into the power track housing assembly while reducing wear and ensuring a good electrical connection.

Those skilled in the art will appreciate that the number and arrangement of the current conducting spring fingers 36 should correspond to the number and arrangement of conductors 3 in the power track housing assembly, which may be varied as described above, so that the plug-in power tap can be inserted any place along the length of the power track housing assembly. In addition, each of the spring finger units corresponding to a bus bar or conductor 3 may be made up of four discrete spring fingers, as illustrated in FIG. 4, may include fewer or more than four fingers or conductive members, or may be made up of a single conductive member.

Figure 4D:
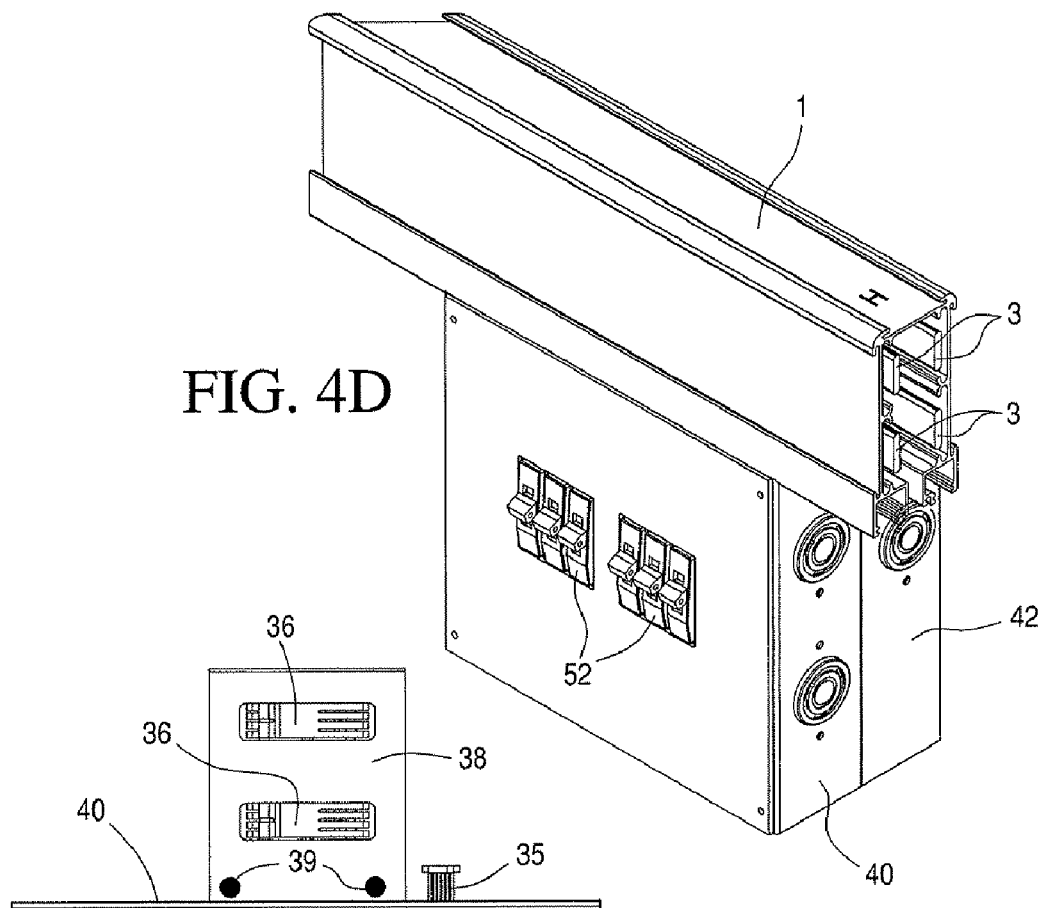
FIG. 4d is an isometric view showing installation of the plug-in power tap of FIG. 4 in the power track housing assembly of FIG. 1.
Figure 4F:
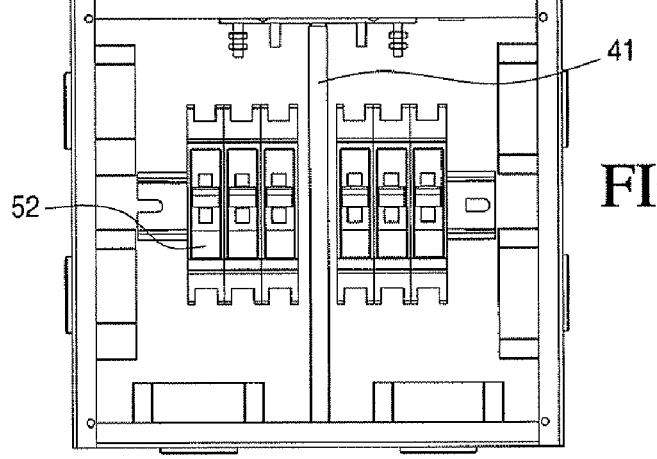
FIG. 4f is a rear view of the power distribution and tower sub-assemblies of the plug-in power tap of FIG. 4.
Figure 4E:
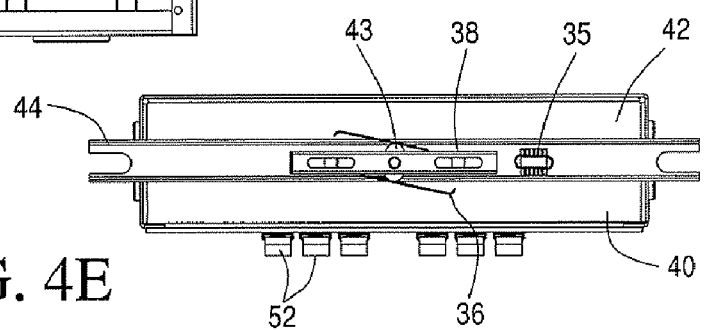
FIG. 4e is a top view of the plug-in power tap of FIG. 4, showing the manner in which spring fingers are extended by action of a cam.

After the plug-in power tap assembly is inserted into the power track housing assembly, shaft-cam assembly 47 including individual cams 43 is rotated to cause the spring fingers 36 to extend, as shown in FIG. 4e, and make contact with the power track housing assembly conductors. This allows the plug-in power taps of the illustrated embodiments to be located and securely connected anywhere along the length of the power track housing assembly.

As shown in FIGS. 4 and 4a-4g, the preferred plug-in power tap assembly may, by way of example and not limitation, be made up of three sub-assemblies: a tower sub-assembly 38; a distribution sub-assembly 40; and electronics sub-assembly 42 (it is also within the scope of the invention to integrate the sub-assemblies into a single assembly or just two sub-assemblies). As illustrated, the tower sub-assembly 38 is substantially planar in shape for insertion into the power track housing assembly and contains the plurality of current conducting fingers 36, mounted on the tower front and tower back, while the distribution sub-assembly 40 is a parallel-piped or box shaped enclosure that contains power receptacles 50 and abuts parallel-piped or box shaped electronics sub-assembly 42, as best shown in FIG. 4. As best shown in FIGS. 4f and 4h, the tower sub-assembly 38 is mounted on the distribution sub-assembly 40 to that an opening in the top of the distribution sub-assembly provides passage for cam shaft 41 into the distribution sub-assembly 40 where it can be accessed by a user in order to rotate the shaft. Of course, the illustrated shapes of the respective sub-assemblies are not intended to be in any way limiting, except that the tower sub-assembly 38 must be configured to fit into the power track housing assembly.

As shown in FIG. 4a, the multiple cams or eccentric members 43 of the cam assembly 47 are fixed to the camshaft 41 and arranged to press against and thereby extend respective fingers 36 on each side of the tower sub-assembly 38 when the camshaft 41 is rotated after the plug-in power tap is inserted into the power track housing assembly. In the illustrated configuration, the installer can use a tool, such as a wrench, to rotate the cam shaft and establish and electrical connection between the spring fingers 36 and the conductors 3 after the plug-in power tap assembly has been mounted to the power track housing assembly. Alternatively, it is also within the scope of the invention to provide grips or handles, or other mechanisms to facilitate rotation of the shaft 41. A mounting bracket 44, shown in FIG. 4, may be used to secure the plug-in power tap to the power track housing assembly before the camshaft 41 is rotated although the bracket may be omitted and/or other mechanisms or means for securing the plug-in power tap to the power track housing assembly may be substituted. An alternative mounting bracket 44a is shown in FIGS. 4g to 4i.

For safety considerations, grounding finger springs 35, shown in detail in FIG. 4d, are provided to establish a ground connection between the power track housing assembly and the plug-in power tap assembly before the current conducting fingers 36 make contact with the potentially high voltage power track housing assembly conductors 4.

Figure 4G:
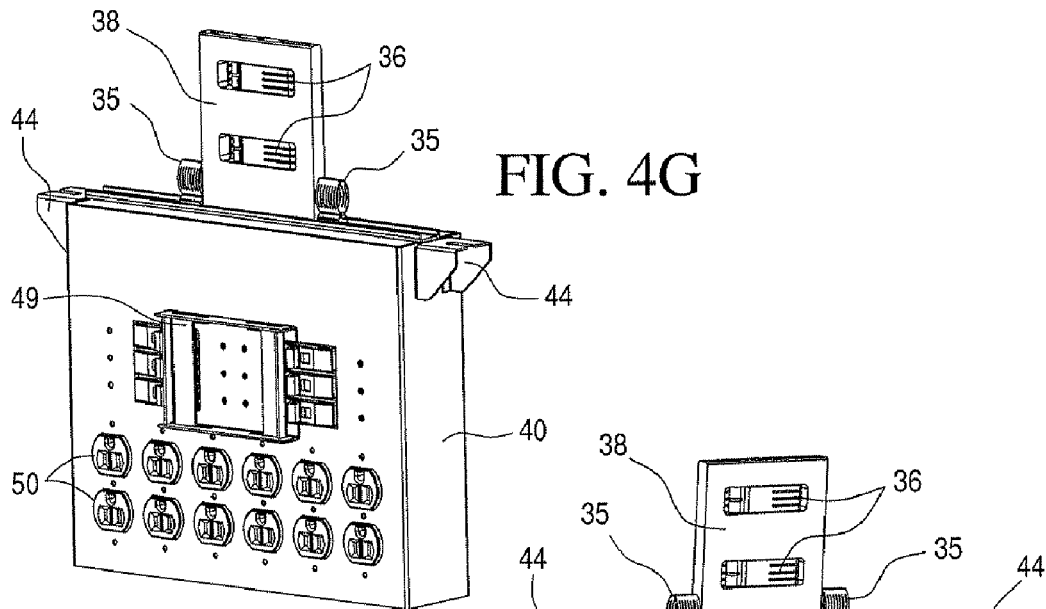
FIG. 4g is an isometric view of a variation of the plug-in power tap of FIG. 4, which not only includes a plurality of protective devices but also a plurality of receptacles.
Figure 4H:
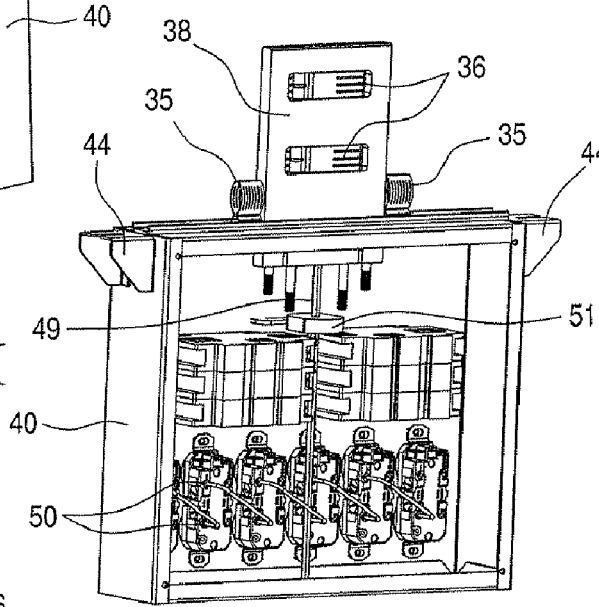
FIG. 4h is an isometric view taken from the rear of the plug-in power tap of FIG. 4g.
Figure 4I:
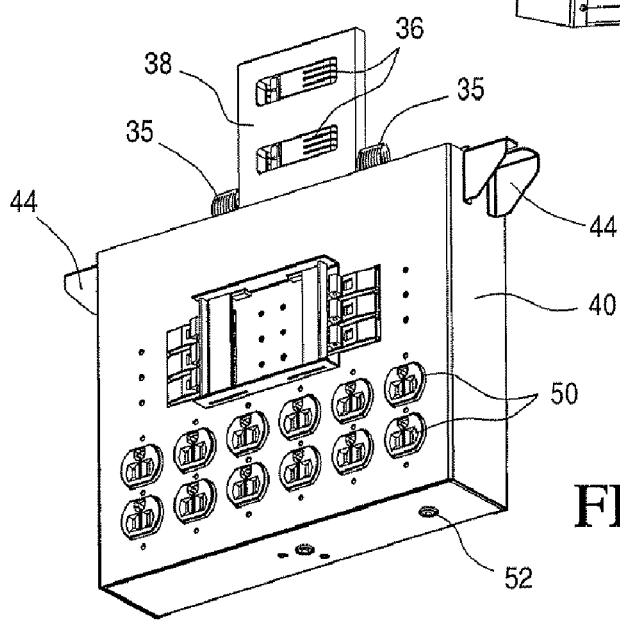
FIG. 4i is an isometric view taken from below the plug-in power tap of FIG. 4g.

Also, as shown in FIGS. 4g to 4i, a safety locking device in the form of a locking slide member 49 having an extension that engages a locking cam 51 on the camshaft 41 may be included to prevent the camshaft 41 from being rotated to retract or extend the fingers 36 unless the locking slide member 49 is moved to an "open" or unlocked position. The locking slide member 49 may extend to the outside of the distribution sub-assembly 40 so as to be accessible from outside the sub-assembly as illustrated in FIGS. 4e and 4g. Other approaches to ensuring preventing accidental removal of the plug-in power tap from the power track housing assembly include, but are not limited to, inclusion of a tang connected to the slide and arranged to cover mounting fasteners associated with mounting bracket 44 so that the mounting fasteners cannot be turned without "opening" the protective device.

As illustrated in FIGS. 4 and 4e-4g, a removable cover 43 on the distribution and/or electronics sub-assembly 40 can be fabricated of any material, including IR, RF, or optically transparent material. Fabrication of an IR transparent material has the advantage of allowing users to make IR temperature inspections easily. On the other hand, use of an RF transparent material allows wireless transmission through the cover, while use of an optical transparent cover allows fiber optic receivers to be placed against or close to the cover to pick up optically transmitted data. In either case, the power track housing assembly of FIG. 1 can have a bare fiber optic strand incorporated to receive optical or IR transmitted data from the plug-in power tap assembly, with optical or IR transmitters being incorporated in the plug-in power tap assembly to transmit/receive data processed by monitoring circuitry within the electronics sub-assembly. Multiple transmitters/receivers can be mounted for redundancy, or for encoding or multiplexing.

As illustrated in FIG. 4, an optional antenna 57 may be mounted on the electronics sub-assembly 42 for wireless RF data communications. If mounted on top of the electronics sub-assembly 42 in the position illustrated in FIG. 4, the signals will advantageously be transmitted/received within the power track housing assembly cavity, thereby shielding the signal from external interference or from radiating interference. Multiple antennas can be mounted for redundancy or for encoding or for multiplexing.

As shown in FIGS. 4 and 4d-4i, the distribution sub-assembly 40 of the plug-in power tap assembly may contain circuit breakers 52, receptacles 50, fused disconnects and/or any other current or power activated protective devices, the number and arrangement of which may depend on the number and arrangement of conductors 3 in the power track housing assembly. The protective devices may be connected to a connector or port, or to a cable 44 that exits via a grommet 50 for connection to a load or loads.

In addition, as shown in FIG. 4b, the tower sub-assembly 40 may also house current sensors, contact and non-contact temperature sensors 58,59 that can send signals externally or to the internal electronics section. Built-in voltage sensors may be imbedded or attached to the conductors to detect conductor and/or plug-in power tap voltage levels. All data can be displayed on a display mounted on the electronics sub-assembly 42 or transmitted via wire or wireless to a remote location.

Examples of electronic circuits or components that may be contained in the electronics sub-assembly 42 include, but are not limited to:

Modules for monitoring and data collection of voltage, temperature, individual distribution component currents, individual or total power parameters and/or simplex, duplex or multiplex communications.

Power conversion modules such as: AC to DC converters/inverters, DC power supplies, frequency converters/inverters, energy storage components, transfer switches, line regulators or other power conversion circuits/components.

The DC logic power for the electronics can be derived from the power being supplied from the power track housing assembly conductors 3 or from external sources via signal cables 46. Terminations for the wire, wireless or fiber communications can be contained in the electronic sub-assembly 42 as a stand alone plug-in, or included in the electronic and/or distribution sub-assemblies of any plug-in power tap.

As described above in connection with FIGS. 1 and 1a, the power track housing 1 has connectors 4 placed at intervals along the length of the housing. As a result, the connectors and the associated conductors can form a communications network into which the plug-in power tap can be attached via corresponding connectors and signal cables 45 and 46. A second set of connectors and cable can be incorporated in a second of the sub-cavities 8 shown in FIGS. 1 and 1a for encoding or for multiplexing. As shown in FIG. 4g, optical or IR transmitters/receivers 52 can also be incorporated in the bottom of the plug-in power tap assembly to transmit data to and from floor mounted cabinets.

After the plug-in power taps are inserted into the power track housing assembly, the opening between the plug-in power taps can be covered with snap-in covers 38. The covers can slide over each other so any size opening between plug-in power taps can be covered. The cover material may optionally be a current and/or magnetic field conducting material for RF shielding or EMI protection.

Figure 5:
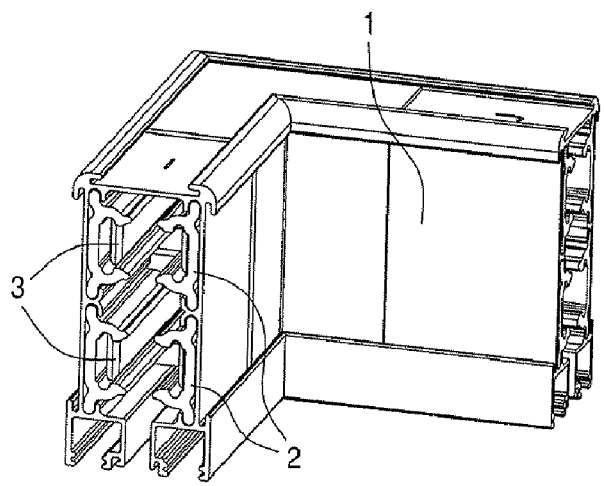
FIGS. 5, 5a, and 5b are isometric views respectively showing a "T", "X", and 90 degree splice assembly constructed in accordance with the principles of a preferred embodiment of the invention.
Figure 5A:
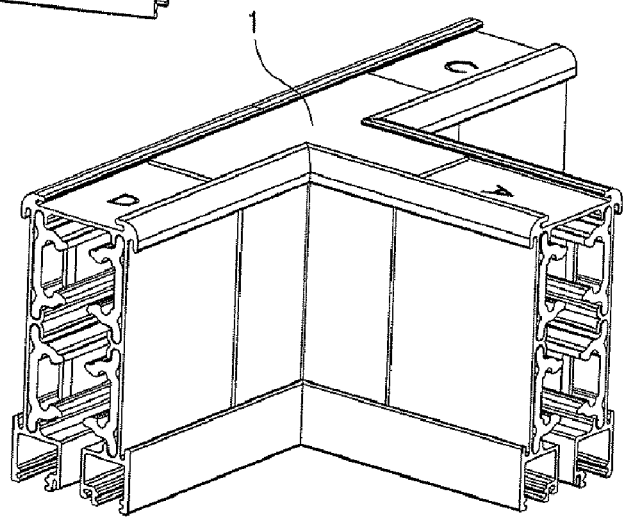
Figure 5B:
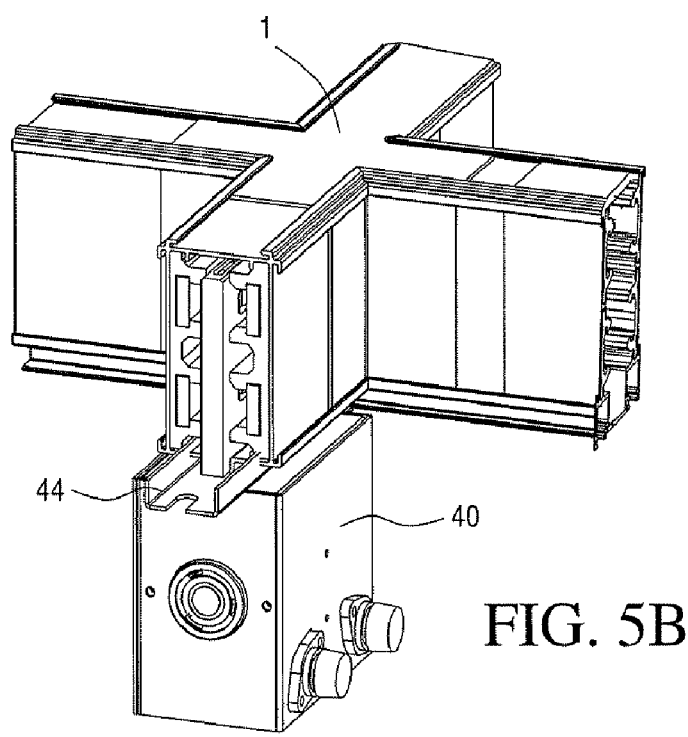

FIGS. 5, 5a, and 5b illustrate variations of the power track housing assembly of FIGS. 1 and 1a, in which the housings form "T", "X" and 90 degree assemblies that, together with the basic linear assembly of FIGS. 1 and 1a, permit installers to generate unique CBusPDS configurations to match the arrangement layout of the powered equipment. Aside from the different shapes of the assemblies shown in FIGS. 5, 5a, and 5b, the internal arrangements of the assemblies are the same, with each assembly being arranged to be joined any other assembly by the splice assembly shown in FIGS. 2, 2a, and 2b, and to receive a plug-in power tap of the type shown in FIGS. 4 and 4a-4g, as well as in FIG. 5b.

Figure 6:
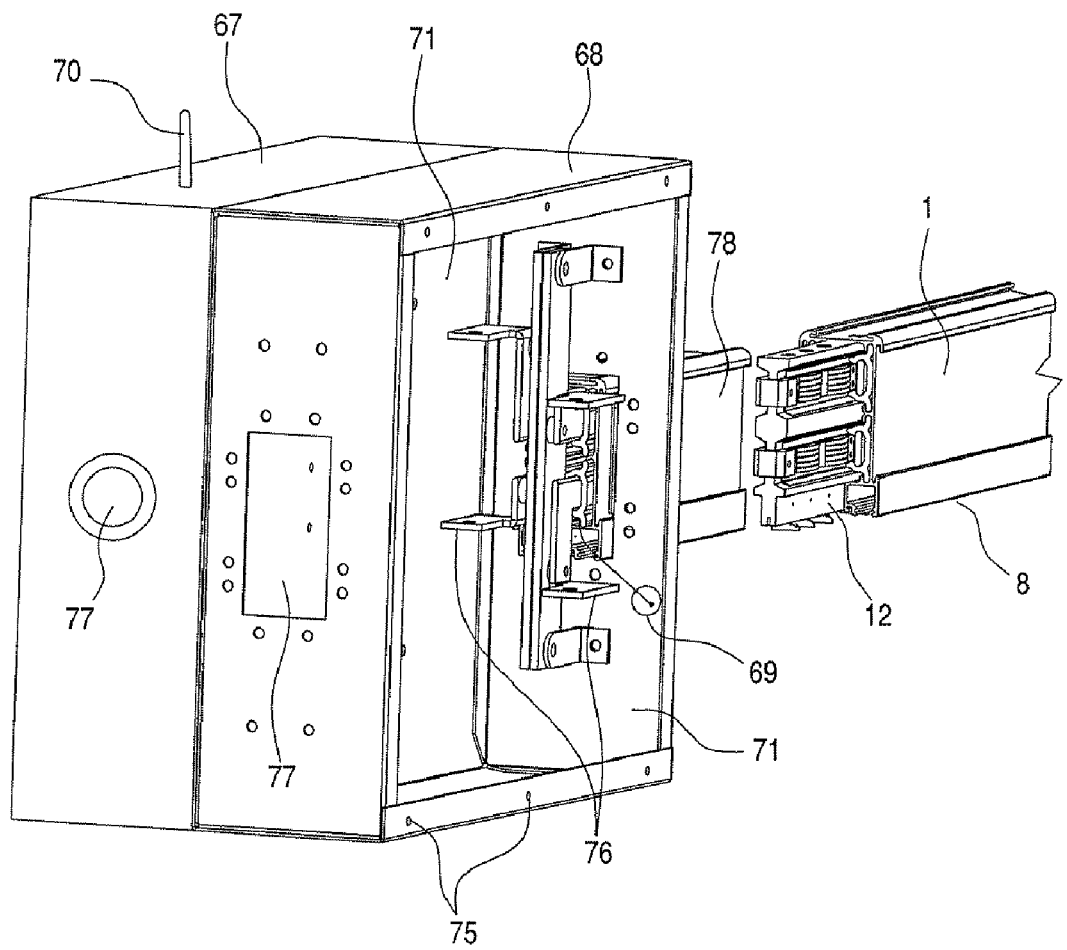
FIG. 6 is an isometric view of a track housing power termination sub-assembly constructed in accordance with the principles of the preferred embodiment of the invention, shown with a mating splice.

FIG. 6 shows an example of a track housing power termination assembly according to the preferred embodiment of the invention. The assembly may optionally contain a two integrated sub assemblies: an input power sub-assembly 68 and an electronics sub-assembly 67, although the sub-assemblies may be integrated into a single assembly.

The input power sub-assembly includes compartment 71 arranged to house circuit breakers or other protective devices and is illustrated as accommodating four conductors, although more or less conductors can be incorporated as discussed above in connection with the power track housing assembly. The input power sub-assembly can also house current, voltage, temperature and/or power sensors.

As with the plug-in power taps, the termination assembly may include an optional antenna 70 for wireless communications, optional IR, optical, or other transmitters/receivers for communications, optional connectors for wire communications, and/or visible indicators so the user can determine whether the circuit breaker or fused disconnect or other device is "open" or "closed." Lugs 76 and exit windows 77 may be provided for cable connections or connection to protective devices. The optical or IR transmitters/receivers can be incorporated in the bottom of the plug-in power tap assembly, to transmit data to and from floor mounted cabinets, while antenna 70 may be arranged to transmit collected data that has been compressed for short burst transmission to limit interference. Multiple antennas can be mounted for redundancy or for encoding or for multiplexing. If fiber optic strand(s) 69 are used the strand(s) 69 and connector(s) can be fed though to the junction box from the track housing power termination assembly for connection external module or to the internal electronics section 67. The DC logic power for the electronics can be derived from the power being supplied from the input power section conductors or from the external sources via one of the signal cables.

The sub-assembly housings of the termination assembly shown in FIG. 6 may be made of metal, an IR or optically transparent material, or any other material, and the termination assembly may also include lugs 76 for securing cables and/or other equipment, as well as cable exit windows 77 and other structures or features conventionally included in a junction box. A separate cover (not shown) may be removably connected to the input power sub-assembly 68 by mounting holes 75, or the module may include a door for enabling access to the protective devices and electronics contained therein. Preferably, a connection section 78 having a configuration similar to the power track housing assembly extends from the input power sub-assembly so that the power track housing assembly can be connected to the termination assembly by an appropriate splice assembly such as splice assembly 11 shown in FIGS. 2, 2a, and 2b.

Figure 7:
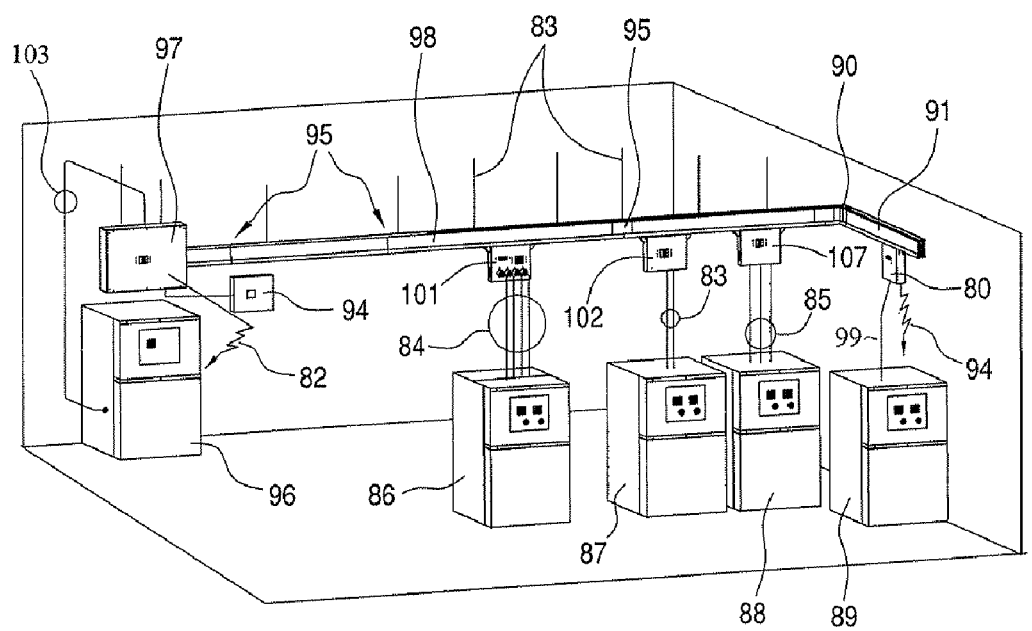
FIG. 7 is an isometric view of one of many possible applications for a CBusPDS made up of at least some of the components illustrated in FIGS. 1-6.

Finally, FIG. 7 illustrates a possible application of the CBusPDS of the preferred embodiment to a typical data center having floor mount equipment. As shown in FIG. 7, one power track housing assembly section 98 of the CBusPDS, including splice joints 93, is ceiling mounted by rods 83, while another power track housing assembly section 91 is wall mounted, though any combination of wall, ceiling, and/or floor mounting arrangements may be used. The two track housing power termination assemblies are spliced together with a "90 degree" section 90. Alternatively, the assemblies could be spliced together using two track housing power termination assemblies with conductors connecting the two housing assemblies.

As is typical, the load equipment is not evenly spaced on the floor. Because of the unique feature that the plug-in power tap assemblies may be mounted anywhere alone the length of the power track housing assembly, however, it does not matter where the load equipment is situated.

FIG. 7 shows four of the many configurations of the plug-in power tap assemblies that are possible according to principles of the invention, as follows:

In one configuration, load cabinet 86 is being powered using multiple power cable drops 84 that plug-in to receptacles of a plug-in power tap 101 corresponding, for example, to the one shown in FIGS. 4g to 4i, which has been inserted into power tap housing assembly 98 corresponding to the one shown in FIGS. 1 and 1a.

In a second configuration, load cabinet 87 is powered using one power drop fixedly mounted in the plug-in power tap assembly 102, and a signal cable drop is used for communication or other small signal functions, the power and signal drop indicated in FIG. 7 by reference numeral 83.

In a third configuration, load cabinet 88 is being powered using multiple power drops 85 supplying three phase power and fixedly mounted in the plug-in power tap assembly 3.

Finally, in a fourth illustrated configuration, load cabinet 89 is supplied with DC power using one two-conductor power drop cable 99 fixedly mounted in the plug-in power tap assembly 80, the DC power being generated by a rectifier mounted in the electronics sub assembly in the plug-in power tap assembly and a communications link 94, for example via IR communications, being provided between the plug-in power tap assembly and the load cabinet.

In all of the illustrated configurations, the plug-in power tap assemblies may have local displays mounted on the respective electronic sub-assemblies and can contain over-current protection and power parameter monitoring devices.

The CBusPDS in this application receives power from a floor mounted cabinet 96 via, for example, a conduit 103 and track housing power termination assembly 97. The track housing power termination assembly can contain an over current protection device and/or power parameter monitoring, as well as a local display of all CBusPDS data and can transmit the data with an RF link 82 to the cabinet 96. In addition, a wall mounted display 94 may be included that can display all network data.

Having thus described a preferred embodiment of the invention and variations of the preferred embodiment in sufficient detail to enable those skilled in the art to make and use the invention, it will nevertheless be appreciated that numerous variations and modifications of the illustrated embodiment may be made without departing from the spirit of the invention. Accordingly, it is intended that the invention not be limited by the above description or accompanying drawings, but that it be defined solely in accordance with the appended claims.

We claim:

1. An electrical power distribution system, comprising: a power track housing assembly including:
   a housing;
   a plurality of conductors extending from a first end of the housing to a second end of the housing;
   an opening in a bottom of the housing assembly and extending continuously from the first end of the housing to the second end of the housing, said opening being arranged to receive a plug-in power tap anywhere along said length of said housing assembly; and
   additional end openings at said first and second ends of said housing, said additional openings being arranged to receive splice assemblies for connecting together multiple said housing assemblies;
   a plug-in power tap, a portion of which is arranged to be inserted into said power track housing assembly through said bottom opening, said plug-in power tap including:
   a contact extending device including individual cams; and
   a plurality of resilient spring members,
   wherein said contact extending device is positioned to engage and press at least one of said resilient spring members against respective said conductors after said plug-in power tap has been inserted into said housing, to thereby establish an electrical connection between said resilient spring members and said conductors, said plug-in power tap further including at least one receptacle connected to at least one of said resilient spring members for supplying power to equipment upon rotation of said cams into engagement with said resilient spring members and connection of said equipment to said receptacle.

2. An electrical power distribution system as claimed in claim 1, wherein said cam mounted on a shaft arranged to be rotated after insertion of said plug-in power tap into said power track housing assembly.

3. An electrical power distribution system as claimed in claim 2, wherein resilient spring members are mounted on opposites sides of said cam such that rotation of said cam cause the resilient spring members on each side of said cam to engage a respective one of said conductors.

4. An electrical power distribution system as claimed in claim 3, wherein a plurality of said cams are mounted on said camshaft, with one cam for each pair of resilient spring members and conductors.

5. An electrical power distribution system as claimed in claim 1, wherein a number of said conductors is four.

6. An electrical power distribution system as claimed in claim 1, further comprising a splice assembly arranged to be received in one of said end openings of said power track housing assembly to extend a length of said housing assembly by connecting the housing assembly to another said power track housing assembly, said splice assembly including a plurality of conductors arranged to engage said resilient conductors of said housing assembly.

7. An electrical power distribution system as claimed in claim 6, wherein said splice assembly includes a contact-extending mechanism arranged to engage and push said resilient conductors into engagement with said plurality of conductors of said power track housing assembly after insertion of said splice assembly into said one of said end openings of said power track housing assembly.

8. An electrical power distribution system as claimed in claim 7, wherein said contact-extending mechanism is a cam mechanism.

9. An electrical power distribution system as claimed in claim 7, wherein said splice assembly further includes voltage and/or temperature monitoring components.

10. An electrical power distribution system as claimed in claim 1, wherein said plug-in power tap includes circuit breakers or fuses.

11. An electrical power distribution system as claimed in claim 1, wherein said plug-in power tap includes at least one of a DC power supply, a transformer, a voltage inverter/converter, transfer switch, and a frequency inverter/converter.

12. An electrical power distribution system as claimed in claim 1, wherein said plug-in power tap includes monitoring circuitry including at least one of a power monitoring circuit and a temperature monitoring circuit.

13. An electrical power distribution system as claimed in claim 12, further comprising a cable carried by said power track housing assembly for carrying electrical signals from said monitoring circuitry to remote monitoring or display equipment.

14. An electrical power distribution system as claimed in claim 13, wherein said cable is a fiber optic cable.

15. An electrical power distribution system as claimed in claim 12, wherein said plug-in power tap, and/or a splice assembly for said power track housing assembly to another power track housing assembly, includes a transceiver for communicating with remote monitoring or display equipment.

16. An electrical power distribution system as claimed in claim 15, wherein said transceiver is connected to an antenna extending from said plug-in power tap, said antenna being inserted into said power track housing assembly when said portion of said plug-in power tap is inserted into said power track housing assembly.

17. An electrical power distribution system as claimed in claim 1, wherein said plug-in power tap further comprises a bracket for securing said plug-in power tap to said power track housing assembly following insertion of said portion into said power track housing assembly.

18. An electrical power distribution system as claimed in claim 1, wherein said plug-in power tap further comprises a locking slide arranged to be movable to a locking position in which said contact-extending device is prevented from moving to engage or disengage said at least one resilient spring member, and to be movable to an unlocking position in which said cam is free to be manually moved to engage or disengage said at least one resilient spring member.

19. An electrical power distribution system as claimed in claim 1, wherein said plug-in power tap includes: a tower sub-assembly including said portion arranged to be inserted into said power track housing assembly, said portion including said contact-extending device and resilient spring members; a distribution sub-assembly including said at least one receptacle; and an electronics sub-assembly including monitoring circuitry.

20. An electrical power distribution system as claimed in claim 1, wherein said plug-in power tap includes at least one grounding member extending from a top of said plug-in power tap and arranged to contact a grounded element of said power track housing assembly when said portion of said plug-in power tap is inserted into said power track housing assembly.

21. An electrical power distribution system as claimed in claim 1, further comprising an internal mechanical support arranged to be inserted into said power track housing assembly and to engage said conductors in order to prevent said conductors from deforming upon occurrence of a short circuit.

22. An electrical power distribution system as claimed in claim 1, wherein said housing of said power track housing assembly is made of an EMI shielding material.

23. An electrical power distribution system as claimed in claim 1, wherein said housing of said power track housing assembly is made of an electrically conductive material.

24. An electrical power distribution system as claimed in claim 1, wherein said housing of said power track housing assembly includes exterior grooves for receiving EMI shielding plates.

25. An electrical power distribution system as claimed in claim 1, wherein said housing of said power track housing assembly includes interior grooves for accommodating insulators that surround said conductors.

26. An electrical power distribution system as claimed in claim 1, further comprising a termination sub-assembly including a power termination junction box for connecting said conductors to an input power supply, said termination sub-assembly being arranged to be connected to said power track housing assembly by a splice assembly having one end that fits into one of said end openings of the power track housing assembly and a second end that fits into a corresponding opening in the termination sub-assembly.

27. An electrical power distribution system as claimed in claim 26, wherein said termination sub-assembly further includes an electronics section for housing monitoring circuitry connected to monitoring circuits in said plug-in power tap by a cable or by a wireless connection, and which is further connected to a remote monitor or display by a cable, wireless connection, or network.

28. An electrical power distribution system as claimed in claim 1, wherein said power track housing assembly is linear.

29. An electrical power distribution system as claimed in claim 1, wherein said power track housing assembly is "L" shaped.

30. An electrical power distribution system as claimed in claim 1, wherein said power track housing assembly is "T" shaped.

31. An electrical power distribution system as claimed in claim 1, wherein said power track housing assembly is "X" shaped.

32. A power track housing assembly for an electrical power distribution system, comprising:
a housing;
a plurality of conductors extending from a first end of the housing to a second end of the housing;
a opening in a bottom of the housing assembly and extending continuously from the first end of the housing to the second end of the housing, said opening being arranged to receive a plug-in power tap anywhere along said length of said housing assembly; and
additional end openings at said first and second ends of said housing, said additional openings being arranged to receive splice assemblies for connecting together multiple said housing assemblies,
wherein said power track housing assembly is adapted to receive a portion of a plug-in power tap through said bottom opening, said plug-in power tap including a contact-extending device and a plurality of resilient spring members, said contact-extending device being positioned to engage and press at least one of said resilient spring members against respective said conductors after said plug-in power tap has been inserted into said housing to thereby establish an electrical connection between said resilient spring members and said conductors, and
wherein said power track housing assembly further includes a compartment for carrying at least one data bus for establishing communications between a monitoring circuit in said plug-in power tap and a remote monitor or display.

33. A power track housing assembly as claimed in claim 32, wherein said cable is a fiber optic cable.

34. A power track housing assembly as claimed in claim 32, wherein said housing of said power track housing assembly is made of an EMI shielding material.

35. A power track housing assembly as claimed in claim 32, wherein said housing of said power track housing assembly is made of an electrically conductive material.

36. A power track housing assembly as claimed in claim 32, wherein said housing of said power track housing assembly includes exterior grooves for receiving EMI shielding plates.

37. A power track housing assembly as claimed in claim 32, wherein said housing of said power track housing assembly includes interior grooves for accommodating insulators that surround said conductors.

38. A power track housing assembly as claimed in claim 32, wherein said housing of said power track housing assembly is adapted to receive an antenna extending from said plug-in power tap, said antenna being connected to monitoring circuitry in said plug-in power tap, and said antenna being shielded by said housing upon insertion of said plug-in power tap portion into said housing.

39. An electrical power distribution system as claimed in claim 32, wherein said power track housing assembly is "L" shaped.

40. A power track housing assembly as claimed in claim 32, wherein said power track housing assembly is "T" shaped.

41. A power track housing assembly as claimed in claim 32, wherein said power track housing assembly is "X" shaped.

42. A plug-in power tap for an electrical power distribution system including a power track housing assembly having a housing; a plurality of conductors extending from a first end of the housing to a second end of the housing; and an opening in a bottom of the housing assembly and extending continuously from the first end of the housing to the second end of the housing, said opening being arranged to receive said plug-in power tap anywhere along said length of said housing assembly, said plug-in power tap comprising:
a contact-extending device including individual cams; and
a plurality of resilient spring members,
wherein said contact-extending device is positioned to engage and press at least one of said resilient spring members against respective said conductors after said plug-in power tap has been inserted into said housing, to thereby establish an electrical connection between said resilient spring members and said conductors, said plug-in power tap further including at least one receptacle connected to at least one of said resilient spring members for supplying power to equipment upon rotation of said cams into engagement with said resilient spring members and connection of said equipment to said receptacle.

43. A plug-in power tap as claimed in claim 42, wherein said cam is mounted on a camshaft arranged to be rotated after insertion of said plug-in power tap into said power track housing assembly.

44. A plug-in power tap as claimed in claim 43, wherein said resilient spring members are mounted on opposites sides of said cam such that rotation of said cam cause the resilient spring members on each side of said cam to engage a respective one of said conductors.

45. A plug-in power tap as claimed in claim 43, wherein a plurality of said cams are mounted on said camshaft, with one cam for each pair of resilient spring members and conductors.

46. A plug-in power tap as claimed in claim 42, a number of said conductors is four.

47. A plug-in power tap as claimed in claim 42, wherein said plug-in power tap includes circuit breakers.

48. A plug-in power tap as claimed in claim 42, wherein said plug-in power tap includes at least one of a DC power supply, a transformer, a voltage inverter/converter, transfer switch, and a frequency inverter/converter.

49. A plug-in power tap as claimed in claim 42, wherein said plug-in power tap includes monitoring circuitry including at least one of a power monitoring circuit and a temperature monitoring circuit.

50. A plug-in power tap as claimed in claim 42, wherein said plug-in power tap includes a transceiver for communicating with remote monitoring or display equipment.

51. A plug-in power tap as claimed in claim 50, wherein said transceiver is connected to an antenna extending from said plug-in power tap, said antenna being inserted into said power track housing assembly when said portion of said plug-in power tap is inserted into said power track housing assembly.

52. A plug-in power tap as claimed in claim 42, wherein said plug-in power tap further comprises a bracket for securing said plug-in power tap to said power track housing assembly following insertion of said portion into said power track housing assembly.

53. A plug-in power tap as claimed in claim 42, wherein said plug-in power tap further comprises a locking slide arranged to be movable to a locking position in which said contact-extending device is prevented from moving to engage or disengage said at least one resilient spring member, and to be movable to an unlocking position in which said cam is free to be manually moved to engage or disengage said at least one resilient spring member.

54. A plug-in power tap as claimed in claim 42, wherein said plug-in power tap includes: a tower sub-assembly including said portion arranged to be inserted into said power track housing assembly, said portion including said cam and resilient spring members; a distribution sub-assembly including said at least one receptacle; and an electronics sub-assembly including monitoring circuitry.

55. A plug-in power tap as claimed in claim 42, wherein said plug-in power tap includes at least one grounding member extending from a top of said plug-in power tap and arranged to contact a grounded element of said power track housing assembly when said portion of said plug-in power tap is inserted into said power track housing assembly.

56. A splice assembly for an electrical power distribution system including a power track housing assembly having a housing; a plurality of conductors extending from a first end of the housing to a second end of the housing; an opening in a bottom of the housing assembly and extending continuously from the first end of the housing to the second end of the housing, said opening being arranged to receive a plug-in power tap anywhere along said length of said housing assembly; and end openings for receiving said splice assembly, said splice assembly comprising:
a plurality of resilient conductors;
a support for supporting said plurality of resilient conductors; and
a contact-extending mechanism arranged to engage and push said resilient conductors into engagement with said plurality of conductors of said power track housing assembly after insertion of said splice assembly into said one of said end openings of said power track housing assembly,
wherein said splice assembly is arranged to be received in one of said end openings of said power track housing assembly to extend a length of said housing assembly by connecting the housing assembly to another said power track housing assembly.

57. A splice assembly as claimed in claim 56, wherein said contact-extending mechanism is a cam mechanism.

58. A splice assembly as claimed in claim 56, further comprising voltage and/or temperature monitoring components.

* * * * *